US010968294B2

(12) United States Patent
Corberan Roc et al.

(10) Patent No.: US 10,968,294 B2
(45) Date of Patent: Apr. 6, 2021

(54) PROCESS FOR PREPARING HIGH-REACTIVITY ISOBUTENE HOMO- OR COPOLYMERS

(71) Applicant: BASF SE, Ludwigshafen am Rhein (DE)

(72) Inventors: Rosa Corberan Roc, Ludwigshafen (DE); Klaus Muehlbach, Ludwigshafen (DE); Thomas Wettling, Ludwigshafen (DE); Sergei V. Kostjuk, Minsk (BY); Irina Vasilenko, Minsk (BY); Dmitryi Shiman, Minsk (BY)

(73) Assignee: BASF SE, Ludwigshafen (DE)

(*) Notice: Subject to any disclaimer, the term of this patent is extended or adjusted under 35 U.S.C. 154(b) by 107 days.

(21) Appl. No.: 16/073,586

(22) PCT Filed: Feb. 13, 2017

(86) PCT No.: PCT/EP2017/053098
§ 371 (c)(1),
(2) Date: Jul. 27, 2018

(87) PCT Pub. No.: WO2017/140603
PCT Pub. Date: Aug. 24, 2017

(65) Prior Publication Data
US 2019/0062472 A1    Feb. 28, 2019

(30) Foreign Application Priority Data
Feb. 16, 2016  (EP) ...................................... 16155930

(51) Int. Cl.
C08F 4/14          (2006.01)
C08F 10/10         (2006.01)
C08F 110/10        (2006.01)

(52) U.S. Cl.
CPC .............. *C08F 110/10* (2013.01); *C08F 4/14* (2013.01); *C08F 10/10* (2013.01)

(58) Field of Classification Search
None
See application file for complete search history.

(56) References Cited

U.S. PATENT DOCUMENTS

| | | | |
|---|---|---|---|
| 5,340,881 | A | 8/1994 | Kennedy et al. |
| 5,408,018 | A | 4/1995 | Rath |
| 2013/0041121 | A1* | 2/2013 | Konig .................. C08F 110/10 526/146 |

FOREIGN PATENT DOCUMENTS

| | | |
|---|---|---|
| DE | 27 02 604 A1 | 7/1978 |
| EP | 0 145 235 A1 | 6/1985 |
| WO | WO 99/64482 A1 | 12/1999 |
| WO | WO 2011/101281 A1 | 8/2011 |

OTHER PUBLICATIONS

Shiman, D. I. et al., "Cationic polymerization of isobutylene by AlCl3/ether complexes in non-polar solvents: Effect of ether structure on the selectivity of b-H elimination". Polymer 2013, 54(9), 2235-2242 (Year: 2013).*
LibreTexts Project, "Introduction to Inorganic Chemistry", 2020, UC Davis Library. (Year: 2020).*
International Search Report dated Jul. 20, 2017, in PCT/EP2017/053098 filed Feb. 13, 2017.
Shiman, D.I. et al.,, "Cationic polymerization of isobutylene by AlCl$_3$/ether complexes in non-polar solvents: Effect of ether structure on the selectivity of β-H elimination", Polymer, vol. 54, 2013, pp. 2235-2242.
Shiman, D.I. et al., "Cationic Polymerization of Isobutylene by Complexes of Alkylaluminum Dichlorides with Diisopropyl Ether: An Activating Effect of Water", Journal of Polymer Science, Part A: Polymer Chemistry, vol. 52, 2014. pp. 2386-2393.
U.S. Appl. No. 16/074,229, filed Jul. 31, 2018, Rosa Corberan Roc et al.
International Search Report for PCT Patent Application No. PCT/EP2017/053098, dated Jul. 20, 2017, 4 pages.
Edward C. Leonard "Vinyl and Diene Monomers", High Polymers, vol. XXIV (part 2), John Wiley & Sons Publishers, 1971, pp. 713-733.
James Burrington, et al., "Cationic Polymerization Using Heteropolyacid Salt Catalysts", Topics in Catalysis, vol. 23, Issue 1-4, Aug. 2003, pp. 175-181.
An-Ru Guo, et al., "Synthesis of highly reactive polyisobutylenes with exo-olefin terminals via controlled cationic polymerization with H$_2$O/FeCl$_3$/iPrOH initiating system in nonpolar hydrocarbon media", Journal of Polymer Science, Part A: Polymer Chemistry, vol. 51, Issue 19, 2013, pp. 4200-4212.
Sergei V. Kostjuk, et al., "Novel initiating system based on AlCl$_3$ etherate for quasiliving cationic polymerization of styrene", Polymer Bulletin, vol. 52, Issue 3-4, Oct. 2004, pp. 227-234.

* cited by examiner

*Primary Examiner* — Richard A Huhn
(74) *Attorney, Agent, or Firm* — Grüneberg and Myers PLLC

(57) ABSTRACT

The present invention relates to a process for preparing high-reactivity isobutene homo- or copolymers with a content of terminal vinylidene double bonds per homo- or copolymer chain end of at least 70 mol % which comprises polymerizing isobutene or an isobutene-comprising monomer mixture in the presence of an aluminum trihalide-donor complex effective as a polymerization catalyst or of an alkylaluminum halide-donor complex, said complex comprising, as the donor, a mixture of at least two organic compounds with at least one ether function each.

20 Claims, No Drawings

PROCESS FOR PREPARING HIGH-REACTIVITY ISOBUTENE HOMO- OR COPOLYMERS

The present invention relates to a novel process for preparing high-reactivity isobutene homo- or copolymers with a content of terminal vinylidene double bonds per polyisobutene chain end of at least 70 mol %. The present invention further relates to novel isobutene polymers.

In contrast to so-called low-reactivity polymers, high-reactivity isobutene homo- or copolymers are understood to mean those polyisobutenes which comprise a high content of terminal ethylenic double bonds (α-double bonds) and other reactive double bonds susceptible to subsequent reactions, such as Alder-Ene-reaction with maleic acid anhydride, specifically in practice usually of at least 70, preferably at least 75 and very preferably at least 80 mol %, based on the individual chain ends of the polyisobutene macromolecules. In the context of the present application, vinylidene groups are understood to mean those terminal ethylenic double bonds whose position in the polyisobutene macromolecule is described by the general formula

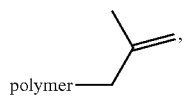

i.e. the double bond is present in an an position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions. The uses of high-reactivity polyisobutenes include use as intermediates for preparing additives for lubricants and fuels, as described, for example, in DE-A 27 02 604.

Such high-reactivity polyisobutenes are obtainable, for example, by the process of DE-A 27 02 604 by cationic polymerization of isobutene in the liquid phase in the presence of boron trifluoride as a catalyst. A disadvantage here is that the polyisobutenes obtained have a relatively high polydispersity. The polydispersity is a measure of the molecular weight distribution of the resulting polymer chains and corresponds to the quotient of weight-average molecular weight $M_w$ and number-average molecular weight $M_n$ (PDI=$M_w/M_n$).

Polyisobutenes with a similarly high proportion of terminal double bonds but with a narrower molecular weight distribution are, for example, obtainable by the process of EP-A 145 235, U.S. Pat. No. 5,408,018 and WO 99/64482, the polymerization being effected in the presence of a deactivated catalyst, for example of a complex of boron trifluoride with alcohols and/or ethers.

High-reactivity polyisobutenes are also obtainable by living cationic polymerization of isobutene and subsequent dehydrohalogenation of the resulting polymerization product, for example by the process from U.S. Pat. No. 5,340,881. However, such a process is complex since the halogen end group introduced with the living cationic polymerization has to be eliminated in a separate step in order to generate the double bond.

It has additionally been known for some time that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

In the literature article "Cationic polymerization using heteropolyacid salt catalysts" in Topics in Catalysis Vol. 23, p. 175-181 (2003), James D. Burrington et al. indicate that, with aluminum trichloride as a polymerization catalyst for isobutene, only low-reactivity polyisobutenes with a low content of terminal vinylidene double bonds (α-double bonds) can be obtained. For instance, table 1 on page 178 of this literature article cites an example of a polyisobutene prepared with $AlCl_3$, which has a number-average molecular weight $M_n$ of 1000-2000, a polydispersity $M_w/M_n$ of 2.5-3.5 and a content of vinylidene isomer (α-double bond) of only 5% (in addition to 65% "tri", 5% "β" and 25% "tetra").

In the literature article "Novel initiating system based on $AlCl_3$ etherate for quasiliving cationic polymerization of styrene" in Polymer Bulletin Vol. 52, p. 227-234 (2004), Sergei V. Kostjuk et al. describe a catalyst system composed of 2-phenyl-2-propanol and an aluminum trichloride/din-butyl ether complex for polymerization of styrene. The polydispersities $M_w/M_n$ of the styrene polymers thus prepared are "~2.5" (see summary) or "~3" (see page 230).

WO 11/101281 disclose the preparation of highly reactive polyisobutene polymers by polymerizing a monomer mixture containing isobutene in the presence of an aluminum trihalogenide donor complex acting as a polymerization catalyst. The donor complex comprises an organic compound having at least one ether function or a carboxylic acid function as the donor.

Dmitriy I. Shiman, Irina V. Vasilenko, Sergei V. Kostjuk, Journal of Polymer Science, Part A: Polymer Chemistry 2014, 52, 2386-2393 disclose the preparation of polyisobutene polymers by polymerizing isobutene in the presence of an alkylaluminum halogenide an ether complex as a polymerization catalyst.

It was an object of the present invention to provide a process for preparing high-reactivity isobutene homo- or copolymers with an increased content of terminal vinylidene double bonds per polyisobutene chain end of at least 70 mol % and simultaneously with a narrow molecular weight distribution (i.e. low polydispersities) in acceptable yields. The catalyst system should at the same time have sufficient activity and service life, the handling thereof should be unproblematic and it should not be prone to failure.

The object was achieved by a process for preparing high-reactivity isobutene homo- or copolymers with a content of terminal vinylidene double bonds per polyisobutene chain end of at least 70, preferably at least 75 and very preferably at least 80 mol %, which comprises polymerizing isobutene or an isobutene-comprising monomer mixture in the presence of an aluminum trihalide-donor complex effective as a polymerization catalyst or of an alkylaluminum halide-donor complex, said complex comprising, as the donor, a mixture of at least two organic compounds with at least one ether function each.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise less than 2 mol %, preferably less than 1 mol %, very preferably less than 0.7 mol % and especially less than 0.5 mol % of copolymerized monomers other than isobutene, for example isoprene or linear butenes, preferably 1-butene, cis-2-butene, and trans-2-butene.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethyl-propyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_5$- to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$- to $C_8$-cycloalkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(trifluoromethyl)phenyl, (trichloro)methylphenyl and bis(trichloromethyl)phenyl.

A $C_7$- to $C_{20}$-arylalkyl radical or a $C_7$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkylphenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl.

A suitable aluminum trihalide is especially aluminum trifluoride, aluminum trichloride or aluminum tribromide, preferably aluminum trichloride. A useful alkylaluminum halide is especially a mono($C_1$- to $C_4$-alkyl)aluminum dihalide or a di($C_1$- to $C_4$-alkyl)aluminum monohalide, for example methylaluminum dichloride, ethylaluminum dichloride, iso-butylaluminum dichloride, dimethylaluminum chloride or diethylaluminum chloride, diiso-butylaluminum chloride, preferably ethylaluminum dichloride, iso-butylaluminum dichloride, diethylaluminum chloride or diiso-butylaluminum chloride and very preferably ethylaluminum dichloride and iso-butylaluminum dichloride. In a preferred embodiment, isobutene or an isobutene-comprising monomer mixture is polymerized in the presence of an alkyl aluminum dichloride-donor complex or an dialkyl aluminum chloride-donor complex effective as a polymerization catalyst.

According to the invention the aluminum trihalide-donor complex or alkylaluminum halide-donor complex effective as a polymerization catalyst comprises, as the donor, comprises a mixture of at least two different organic compounds each with at least one ether function, compounds with at least one ether function are also understood to mean acetals and hemiacetals. Each of the ether compounds may comprise one or more ether functions, e.g. one, two, three, four or even more ether functions, preferably one or two ether functions and very preferably one ether function.

The mixture of different organic compounds may comprise two, three, four or even more different compounds with at least one ether function, preferably two or three different compounds and very preferably two different compounds.

In a preferred embodiment of the present invention, an aluminum trihalide-donor complex or an alkylaluminum halide complex, especially an alkyl aluminum dichloride-donor complex or an dialkyl aluminum chloride-donor complex is used, which comprises, as the donor, a mixture of dihydrocarbyl ethers each of the general formula $R^1$—O—$R^2$ in which the variables $R^1$ and $R^2$ are each independently $C_1$- to $C_{20}$-alkyl radicals, preferably $C_1$- to $C_8$ alkyl radicals especially $C_1$- to $C_4$ alkyl radicals, $C_5$- to $C_8$-cycloalkyl radicals, preferably $C_5$- to $C_6$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals. Preference is given to $C_1$- to $C_4$ alkyl radicals, $C_6$- to $C_{12}$ aryl radicals, and $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms. Examples of such open-chain and cyclic dihydrocarbyl ethers are dimethyl ether, diethyl ether, di-n-propyl ether, diisopropyl ether, di-n-butyl ether, disec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, ethyl tert-butyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, alkyl aryl ethers, such as anisole and phenetole, ditolyl ether, dixylyl ether and dibenzyl ether.

Furthermore, difunctional ethers such as dialkoxybenzenes, preferably dimethoxybenzenes, very preferably veratrol, and ethylene glycol dialkylethers, preferably ethylene glycol dimethylether and ethylene glycol diethylether, are preferred.

Among the dihydrocarbyl ethers mentioned, diethyl ether, diisopropyl ether, di-n-butyl ether and diphenyl ether have been found to be particularly advantageous as donors for the aluminum trihalide-donor complexes or the alkylaluminum halide complexes, especially the alkyl aluminum dihalide- and dialkyl aluminum halide-donor complexes.

In a preferred embodiment a mixture of dihydrocarbyl ethers comprises at least one ether with primary dihydrocarbyl groups and at least one ether with at least one secondary or tertiary dihydrocarbyl group. Ethers with primary dihydrocarbyl groups are those ethers in which both dihydrocarbyl groups are bound to the ether functional group with a primary carbon atom, whereas ethers with at least one secondary or tertiary dihydrocarbyl group are those ethers in which at least one dihydrocarbyl group is bound to the ether functional group with a secondary or tertiary carbon atom.

For the sake of clarity, e.g. diisobutyl ether is deemed to be an ether with primary dihydrocarbyl groups, since the secondary carbon atom of the isobutyl group is not bound to the oxygen of the functional ether group but the hydrocarbyl group is bound via a primary carbon atom.

Preferred examples for ethers with primary dihydrocarbyl groups are diethyl ether, di-n-butyl ether, and di-n-propyl ether.

Preferred examples for ethers with at least one secondary or tertiary dihydrocarbyl group are diisopropyl ether, methyl tert-butyl ether, ethyl tert-butyl ether, and anisole.

Preferred mixtures of ethers according to the invention are diethyl ether/diisopropyl ether, diethyl ether/methyl tert-butyl ether, diethyl ether/ethyl tert-butyl ether, di-n-butyl ether/diisopropyl ether, di-n-butyl ether/methyl tert-butyl ether, and di-n-butyl ether/ethyl tert-butyl ether. Very preferred mixtures are diethyl ether/diisopropyl ether, di-n-butyl ether/diisopropyl ether, diethyl ether/methyl tert-butyl ether, and di-n-butyl ether/ethyl tert-butyl ether, the mixture of diethyl ether/diisopropyl ether being especially preferred.

In addition, particularly advantageous dihydrocarbyl ethers as donors for the aluminum trihalide-donor complexes or the alkylaluminum halide complexes, especially the alkyl aluminum dichloride- and dialkyl aluminum chloride-donor complexes, have been found to be those in which the donor compound has a total carbon number of 3 to 16, preferably of 4 to 16, especially of 4 to 12, in particular of 4 to 8.

The molar ratio of the ether compounds (calculated as the sum of ethers in the mixture) mentioned to the aluminum trihalide or to the alkylaluminum halide, especially to the alkyl aluminum dichloride or dialkyl aluminum chloride, in the donor complex generally varies within the range from 0.2:1 to 1.5:1, especially from 0.3:1 to 1.2:1, in particular 0.4:1 to 1.1:1; in most cases it is 0.4:1 to 1:1. However, it is also possible to work with a greater excess of the donor compounds, often up to a 10-fold and especially 3-fold molar excess; the excess amount of donor compounds then acts additionally as a solvent or diluent.

The molar ratio of the ether compounds in a binary mixture generally varies from 0.1:1 to 1:0.1, preferably from 0.2:1 to 1:0.2, very preferably from 0.3:1 to 1:0.3, more preferably from 0.5:1 to 1:0.5, especially from 0.66:1 to 1:0.66, and even from 0.9:1 to 1:0.9. In a preferable embodiment the ether compounds are present in an equimolar molar ratio.

The molar ratio of the aluminum trihalide or alkylaluminum halide mentioned to the isobutene monomer used in the case of homopolymerization of isobutene, or to the total amount of the polymerizable monomers used in the case of copolymerization of isobutene, based on each individual functional site of the aluminum trihalide or alkylaluminum halide, is generally from 0.001:1 to 0.2:1, preferably 0.002:1 to 0.1:1, very preferably 0.003:1 to 0.08:1, especially 0.005:1 to 0.05:1, and in particular 0.007:1 to 0.03:1.

Typically, the aluminum trihalide-donor complex or the alkylaluminum halide complex, especially the alkyl aluminum dichloride-donor complex or dialkyl aluminum chloride-donor complex, is prepared separately prior to the polymerization from the aluminum trihalide or the alkylaluminum halide, especially from anhydrous alkyl aluminum dichloride or an dialkyl aluminum chloride, and the donor compound, and is then—usually dissolved in an inert solvent such as a halogenated hydrocarbon, for example dichloromethane, or more preferably in unhalogenated hydrocarbons—added to the polymerization medium. However, the complex can also be prepared in situ prior to the polymerization.

In a preferred embodiment of the present invention, the polymerization is performed with additional use of a mono- or polyfunctional, especially mono-, di- or trifunctional, initiator which is selected from organic hydroxyl compounds, organic halogen compounds and water. It is also possible to use mixtures of the initiators mentioned, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, or mixtures of one or more organic halogen compounds and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxyphenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1- propanol, 1- and 2-phenyl-2-propanol, 1- and 2-(p-methoxyphenyl)-2-propanol, 1-, 2-, 3- and 4-phenyl-1-butanol, 1-, 2-, 3- and and 4-(p-methoxyphenyl)-1-butanol, 1-, 2-, 3- and 4-phenyl-2-butanol, 1-, 2-, 3- and 4-(p-methoxyphenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl)methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenylmethanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)phenyl]-9-fluorenol.

Organic halogen compounds which have one halogen atom in the molecule and are suitable as monofunctional initiators are in particular compounds of the general formula $R^6$—Hal in which Hal is a halogen atom selected from fluorine, iodine and especially chlorine and bromine, and $R^6$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)benzene, 1,3-bis(2-chloro-2-propyl)benzene (1,3-dicumyl chloride) and 1,4-bis(2-chloro-2-propyl)benzene (1,4-dicumyl chloride).

The initiator is more preferably selected from organic hydroxyl compounds in which one or more hydroxyl groups are each bonded to an $sp^3$-hybridized carbon atom, organic halogen compounds, in which one or more halogen atoms are each bonded to an $sp^3$-hybridized carbon atom, and water. Among these, preference is given in particular to an initiator selected from organic hydroxyl compounds in which one or more hydroxyl groups are each bonded to an $sp^3$-hybridized carbon atom.

In the case of the organic halogen compounds as initiators, particular preference is further given to those in which the one or more halogen atoms are each bonded to a secondary or especially to a tertiary $sp^3$-hybridized carbon atom.

Preference is given in particular to initiators which may bear, on such an $sp^3$-hybridized carbon atom, in addition to the hydroxyl group, the $R^5$, $R^6$ and $R^7$ radicals, which are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents, where not more than one of the variables $R^5$, $R^6$ and $R^7$ is hydrogen and at least one of the variables $R^5$, $R^6$ and $R^7$ is phenyl which may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents.

For the present invention, very particular preference is given to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene. Among these, preference is given in particular to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane and 1,3- or 1,4-bis(1-hydroxy-1-methylethyl)benzene.

The molar ratio of the initiators mentioned to the isobutene monomer used in the case of homopolymerization of isobutene, or to the total amount of the polymerizable monomers used in the case of copolymerization of isobutene, based on each individual functional site of the initiator, is generally from 0.0005:1 to 0.1:1, especially 0.001:1 to 0.075:1, in particular 0.0025:1 to 0.05:1.

When water is used as the sole initiator or in combination with organic hydroxyl compounds and/or organic halogen compounds as further initiators, the molar ratio of water to the isobutene monomer used in the case of homopolymerization of isobutene, or to the total amount of the polymerizable monomers used in the case of copolymerization of isobutene, is especially from 0.0001:1 to 0.1:1, in particular 0.0002:1 to 0.05:1, preferably 0.0008:1 to 0.04:1, and very preferably in particular 0.001:1 to 0.03:1.

A proportion of the initiator molecules added as organic hydroxyl or halogen compounds is incorporated into the polymer chains. The proportion ($I_{eff}$) of polymer chains which are started by such an incorporated organic initiator molecule may be up to 100%, and is generally 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a nitrogen-containing basic compound.

Such a nitrogen-containing basic compound used may be an aliphatic, cycloaliphatic or aromatic amine of the general formula $R^7$—$NR^8R^9$, or else ammonia, in which the variables $R^7$, $R^8$ and $R^9$ are each independently hydrogen, $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7$—$NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, triisobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a nitrogen-containing basic compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable nitrogen-containing basic compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butylpyridine or else 2-, 3,- or 4-phenylpyridine.

It is possible to use a single nitrogen-containing basic compound or mixtures of such nitrogen-containing basic compounds.

For the use of isobutene or of an isobutene-comprising monomer mixture as the monomer to be polymerized, suitable isobutene sources are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 40 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream from a propylene-isobutane cooxidation or a product stream from a metathesis unit.

Especially when a raffinate 1 stream is used as the isobutene source, the use of water as the sole initiator or as a further initiator has been found to be useful, in particular when polymerization is effected at temperatures of −20° C. to +30° C., especially of 0° C. to +20° C. At temperatures of −20° C. to +30° C., especially of 0° C. to +20° C., when a raffinate 1 stream is used as the isobutene source, it is, however, also possible to dispense with the use of an initiator.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$- to $C_4$-alkylstyrenes such as 2-, 3- and 4-methylstyrene, and 4-tert-butylstyrene, halostyrenes such as 2-, 3- or 4-chlorostyrene, and isoolefins having 5 to 10 carbon atoms, such as 2-methylbutene-1, 2-methylpentene-1, 2-methylhexene-1, 2-ethylpentene-1, 2-ethylhexene-1 and 2-propylheptene-1. Further useful comonomers include olefins which have a silyl group, such as 1-trimethoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, diblock, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or at higher temperatures, i.e. at least 0° C., e.g. at 0° C. to +30° C. or at 0° C. to +50° C. The polymerization in the process according to the invention is, however, preferably performed at relatively low temperatures, generally at −70° C. to −10° C., especially at −60° C. to −15° C.

When the polymerization in the process according to the invention is effected at or above the boiling temperature of the monomer or monomer mixture to be polymerized, it is preferably performed in pressure vessels, for example in autoclaves or in pressure reactors.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloroethane, trichloroethane and 1-chlorobutane, and also halogenated aromatic hydrocarbons and alkylaromatics halogenated in the alkyl side chains, such as chlorobenzene, monofluoro-methylbenzene, difluoromethylbenzene and trifluoromethylbenzene, and mixtures of the aforementioned diluents. The diluents used, or the constituents used in the solvent mixtures mentioned, are also the inert components of isobutenic $C_4$ hydrocarbon streams. A non-halogenated solvent is preferred over the list of halogenated solvents.

The inventive polymerization may be performed in a halogenated hydrocarbon, especially in a halogenated aliphatic hydrocarbon, or in a mixture of halogenated hydrocarbons, especially of halogenated aliphatic hydrocarbons, or in a mixture of at least one halogenated hydrocarbon, especially a halogenated aliphatic hydrocarbon, and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a preferred embodiment, the inventive polymerization is performed in halogen-free aliphatic or especially halogen-free aromatic hydrocarbons, especially toluene. For this embodiment, water in combination with the organic hydroxyl compounds mentioned and/or the organic halogen compounds mentioned, or especially as the sole initiator, have been found to be particularly advantageous.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even if some or all of the initiator used is water, residual moisture should preferably be very substantially or completely removed from solvents and monomers by drying prior to reaction, in order to be able to use the water initiator in a controlled, specified amount, as a result of which greater process control and reproducibility of the results are obtained.

The polymerization of the isobutene or of the isobutenic starting material generally proceeds spontaneously when the aluminum trihalide-donor complex or the alkylaluminum halide complex, especially the alkyl aluminum dichloride-donor complex or dialkyl aluminum chloride-donor complex, is contacted with the isobutene or the isobutenic monomer mixture at the desired reaction temperature. The procedure here may be to initially charge the monomers, optionally in the diluent, to bring it to reaction temperature and then to add the aluminum trihalide-donor complex or the alkylaluminum halide complex, especially the alkyl aluminum dichloride-donor complex or dialkyl aluminum chloride-donor complex. The procedure may also be to initially charge the aluminum trihalide-donor complex or the alkylaluminum halide complex, especially the alkyl aluminum dichloride-donor complex or dialkyl aluminum chloride-donor complex, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the aluminum trihalide-donor complex or the alkylaluminum halide complex, especially the alkyl aluminum dichloride-donor complex or dialkyl aluminum chloride-donor complex. The reaction temperature can be established before or after the addition of the aluminum trihalide-donor complex or the alkylaluminum halide complex, especially of the alkyl aluminum dichloride-donor complex or dialkyl aluminum chloride-donor complex. The procedure may also be first to initially charge only one of the monomers, optionally in the diluent, then to add the aluminum trihalide-donor complex or the alkylaluminum halide complex, especially the alkyl aluminum dichloride-donor complex or dialkyl aluminum chloride-donor complex, and to add the further monomer(s) only after a certain time, for example when at least 60%, at least 80% or at least 90% of the monomer has been converted. Alternatively, the aluminum trihalide-donor complex or the alkylaluminum halide complex, especially the alkyl aluminum dichloride-donor complex or dialkyl aluminum chloride-donor complex, can be initially charged, optionally in the diluent, then the monomers can be added simultaneously or successively, and then the desired reaction temperature can be established. In that case, the start of polymerization is considered to be that time at which the aluminum trihalide-donor complex or the alkylaluminum halide complex, especially the alkyl aluminum dichloride-donor complex or dialkyl aluminum chloride-donor complex, and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the aluminum trihalide-donor complex or the alkylaluminum halide complex, especially the alkyl aluminum dichloride-donor complex or dialkyl aluminum chloride-donor complex, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The aluminum trihalide-donor complex effective as a polymerization catalyst or the alkylaluminum halide complex, especially alkyl aluminum dichloride-donor complex or dialkyl aluminum chloride-donor complex, is generally present in dissolved, dispersed or suspended form in the polymerization medium. Supporting of the aluminum trihalide-donor complex or of the alkylaluminum halide complex, especially of alkyl aluminum dichloride-donor complex or dialkyl aluminum chloride-donor complex, on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the aluminum trihalide-donor complex effective as a polymerization catalyst or the alkylaluminum halide complex, especially the alkyl aluminum dichloride-donor complex or dialkyl aluminum chloride-donor complex, is generally used in such an amount that the molar ratio of aluminum in the aluminum trihalide-donor complex or alkylaluminum halide complex, especially in the alkyl aluminum dichloride-donor complex or dialkyl aluminum chloride-donor complex, to isobutene in the case of homopolymerization of isobutene, or to the total amount of the polymerizable monomers used in the case of copolymerization of isobutene, is in the range from 1:5 to 1:5000, preferably from 1:10 to 1:5000, especially 1:15 to 1:1000, in particular 1:20 to 1:250.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

The process according to the invention serves to prepare high-reactivity isobutene homo- or copolymers with a content of terminal vinylidene double bonds (α-double bonds) per polyisobutene chain end of at least 70, preferably at least 75 and very preferably at least 80 mol %, preferably of at least 85 mol %, more preferably of at least 90 mol %, more preferably of more than 91 mol % and especially of at least 95 mol %, for example of virtually 100 mol %. More particularly, it also serves to prepare high-reactivity isobutene copolymers which are formed from isobutene and at least one vinylaromatic monomer, especially styrene, and have a content of terminal vinylidene double bonds (α-double bonds) per polyisobutene chain end of at least 70, preferably at least 75 mol %, preferably of at least 80 mol %, preferably of at least 85 mol %, more preferably of at least 90 mol %, more preferably of more than 91 mol % and especially of at least 95 mol %, for example of virtually 100 mol %. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers prepared by the process according to the invention and specifically the isobutene homopolymers preferably have a polydispersity (PDI=$M_w/M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values in the case of an optimal process regime are 1.2 to 1.7.

The high-reactivity isobutene homo- or copolymers prepared by the process according to the invention preferably possess a number-average molecular weight $M_n$ (determined by gel permeation chromatography) of preferably 500 to 250 000, more preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

Some of the isobutene polymers which have terminal vinylidene double bonds and also comprise incorporated initiator molecules and occur as the predominant proportion in the isobutene homopolymers prepared in accordance with the invention are novel compounds. The present invention therefore also provides isobutene polymers of the general formula I

(I)

in which
$R^{10}$, $R^{11}$ and $R^{12}$ are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more $C_1$- to $C_4$-alkyl- or $C_1$- to $C_4$-alkoxy radicals or moieties of the general formula II

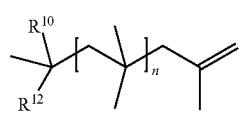
(II)

as substituents, where not more than one of the variables $R^{10}$, $R^{11}$ or $R^{12}$ is hydrogen and at least one of the variables $R^{10}$, $R^{11}$ or $R^{12}$ is phenyl which may also bear one or more $C_1$- to $C_4$-alkyl- or $C_1$- to $C_4$-alkoxy radicals or moieties of the general formula II as substituents, and n is a number from 9 to 4500, preferably 9 to 180, especially 9 to 100, in particular 12 to 50.

In a preferred embodiment, $R^{10}$, $R^{11}$ and $R^{12}$ are each independently hydrogen, $C_1$- to $C_4$-alkyl, especially methyl, ethyl, n-propyl, isopropyl, n-butyl, isobutyl, sec.-butyl or tert-butyl, or phenyl which may also bear one or two $C_1$- to $C_4$-alkyl- or $C_1$- to $C_4$-alkoxy radicals or moieties of the general formula II as substituents, where not more than one of the variables $R^{10}$, $R^{11}$ and $R^{12}$ is hydrogen and at least one of the variables $R^{10}$, $R^{11}$ and $R^{12}$ is phenyl which may also bear one or two $C_1$- to $C_4$-alkyl or $C_1$- to $C_4$-alkoxy radicals or moieties of the general formula II as substituents, and n is a number from 9 to 4500, preferably 9 to 180, especially 9 to 90, in particular 15 to 45.

The process according to the invention successfully polymerizes isobutene or isobutene-comprising monomer mixtures under cationic conditions with satisfactory to high conversions of generally 20 to 100%, especially 35 to 90%, in short reaction times of generally 5 to 120 minutes, especially 30 to 120 minutes, to give high-reactivity isobutene homo- or copolymers with a content of terminal vinylidene double bonds per polyisobutene chain end of at least 70, preferably at least 75 and very preferably at least 80 mol % and with a narrow molecular weight distribution.

It is an advantage of the process according to the present invention that a mixture of ethers as donors yield a product with an increased content of terminal vinylidene double bonds per polyisobutene chain end compared and/or a narrower molecular weight distribution compared with the same reaction carried out in the presence of one single ether of the mixture as a donor under comparable reaction conditions.

The examples which follow are intended to illustrate the present invention in detail without restricting it.

EXAMPLES

The polymerization reactions were carried out in glass tubes equipped with a cold finger condenser or, in some cases, in stainless steel reactor with PTFE lining under argon atmosphere at 10° C. As an example of a typical procedure, polymerization was initiated by adding isobutylene (3.25 g, 5.8×10⁻² mol) to a mixture of a total volume of 5.25 mL, consisting of solutions of an ether (or a mixture of two ethers), 6 μL (3.3×10⁻⁴ mol) of deionized H₂O and with MgSO₄×7H₂O (15% mol of H₂O to $^i$BuAlCl₂) pre-activated $^i$BuAlCl₂ (0.38 mL, 1M) in n-hexane or toluene, and n-hexane (4.8 mL). After 10 min reaction time, ca. 2 mL of ethanol was poured into the reactor to terminate the polymerization. The quenched reaction mixtures were diluted by n-hexane, washed with 0.5 M nitric acid and deionized water to remove the aluminum-containing residues, evaporated to dryness under reduced pressure, and dried in vacuum (<60° C.) to give the polymeric products.

Product yields were determined gravimetrically. The number average molecular weight $M_n$ and the weight average molecular weight $M_w$ was determined by means of Size Exclusion Chromatography (SEC, $M_{nSEC}$) with polystyrene standards, or by ¹H NMR ($M_{nNMR}$). The polydispersity PDI=$M_w/M_n$ was calculated using the thus obtained values.

Composition of reaction products was determined by the ¹H-NMR method and assigned to structures as described in An-Ru Guo, Xiao-Jian Yang, Peng-Fei Yan, Yi-Xian Wu, Journal of Polymer Science, Part A: Polymer Chemistry 2013, 51, 4200-4212, see especially pages 4205 and FIG. 5 on page 4206.

In the context of the present invention the term "exo" refers to terminal ethylenic double bonds, vinylidene groups or α-double bonds, as shown in the formula on page 1. These terms are used synonymously throughout the text.

The term "Total vinylidene" means the terminal ethylenic double bonds referred to as exo above and additionally double bonds located internally at the polymer backbone as shown in the formula on the right:

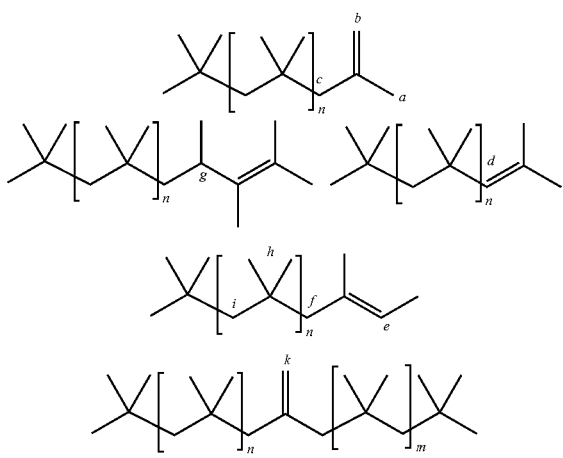

The term "trisubstituted" refers to β-double bonds, as shown in the formulae bottom left and bottom centre. These terms are used synonymously throughout the text.

Furthermore "tetrasubstituted" structural elements can be found as shown in the formula at the top centre.

Example 1 (Comparative)

A polymerization reaction was run as described above using diisopropylether (OiPr$_2$) as the ether component. The molar ratio OiPr$_2$ to iBuAlCl$_2$ was kept at 1.2. A polyisobutene polymer with $M_{nSEC}$=1130 g/mol ($M_{nNMR}$=870 g/mol) was obtained in 61% yield. Polydispersity and double bond distribution of the polymer are shown on Table 1.

TABLE 1

| Example | PDI | Exo | Total vinylidene | Trisubstituted | Tetrasubstituted |
|---|---|---|---|---|---|
| 1 | 2.7 | 85 | 88 | 5 | 7 |

Example 2 (Comparative)

A polymerization reaction was run as described above using diisopropyl ether as the ether component. The molar ratio OiPr$_2$ to iBuAlCl$_2$ was kept at 0.4. A polyisobutene polymer with $M_{nSEC}$=1210 g/mol ($M_{nNMR}$=1200 g/mol) was obtained in 94% yield. Polydispersity and double bond distribution of the polymer are shown on Table 2.

TABLE 2

| Example | PDI | Exo | Total vinylidene | Trisubstituted | Tetrasubstituted |
|---|---|---|---|---|---|
| 2 | 3.7 | 80 | 82 | 9 | 9 |

Example 3 (Comparative)

A polymerization reaction was run as described above using diethyl ether (OEt$_2$) as the ether component. The molar ratio OEt$_2$ to iBuAlCl$_2$ was kept at 0.4. A polyisobutene polymer with $M_{nSEC}$=15040 g/mol ($M_{nNMR}$=12890 g/mol) was obtained in 40% yield. Polydispersity and double bond distribution of the polymer are shown on Table 3.

TABLE 3

| Example | PDI | Exo | Total vinylidene | Trisubstituted | Tetrasubstituted |
|---|---|---|---|---|---|
| 3 | 2.1 | 53 | 53 | 23 | 24 |

Example 4 (Comparative)

A polymerization reaction was run as described above using di-n-butyl ether (OBu$_2$) as the ether component. The molar ratio OBu$_2$ to iBuAlCl$_2$ was kept at 0.4. A polyisobutene polymer with $M_{nSEC}$=1200 g/mol ($M_{nNMR}$=970 g/mol) was obtained in 89% yield. Polydispersity and double bond distribution of the polymer are shown on Table 4.

TABLE 4

| Example | PDI | Exo | Total vinylidene | Trisubstituted | Tetrasubstituted |
|---|---|---|---|---|---|
| 4 | 6.1 | 75 | 77 | 12 | 11 |

Example 5

A polymerization reaction was run as described above using an equimolar mixture of diisopropyl ether and diethyl ether as the ether component. The molar ratio total ether to iBuAlCl$_2$ was kept at 0.4. A polyisobutene polymer with $M_{nSEC}$=1230 g/mol ($M_{nNMR}$=1190 g/mol) was obtained in 80% yield. Polydispersity and double bond distribution of the polymer are shown on Table 5.

TABLE 5

| Example | PDI | Exo | Total vinylidene | Trisubstituted | Tetrasubstituted |
|---|---|---|---|---|---|
| 5 | 2.6 | 83 | 84 | 8 | 8 |

Example 6

A polymerization reaction was run as described above using an equimolar mixture of di-n-butyl ether and diethyl ether as the ether component. The molar ratio total ether to iBuAlCl$_2$ was kept at 0.4. A polyisobutene polymer with $M_{nSEC}$=1710 g/mol ($M_{nNMR}$=1350 g/mol) was obtained in 47% yield. Polydispersity and double bond distribution of the polymer are shown on Table 6.

TABLE 6

| Example | PDI | Exo | Total vinylidene | Trisubstituted | Tetrasubstituted |
|---------|-----|-----|------------------|----------------|------------------|
| 6 | 3.9 | 83 | 84 | 10 | 6 |

The invention claimed is:

1. A process for preparing high-reactivity isobutene homo- or copolymers with a content of terminal vinylidene double bonds per polyisobutene Chain end of at least 70 mol %, the process comprising:
polymerizing isobutene or an isobutene-comprising monomer mixture in the presence of a complex, comprising a donor and an aluminum trihalide or an alkylaluminum halide,
wherein the donor comprises a mixture of at least two ethers selected from the group consisting of dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, ethyl tert-butyl ether, n-propyl n-butyl ether, n-propyl sec-butyl ether, n-propyl isobutyl ether, n-propyl test-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-dioxane, 1,3-dioxane, 1,4-dioxane, dicyclohexyl ether, diphenyl ether, anisole, phenetole, ditolyl ether, dixylyl ether, and dibenzyl ether,
wherein acids employed in the process comprise only carboxylic acids, mineral acids, aluminum trihalides, alkylaluminum dihalides, and/or dialkyl aluminum halides.

2. The process of claim 1, wherein the mixture is a binary mixture having a molar ratio of the first ether to the second ether in in a range of 0.1:1 to 1:0.1.

3. The process according of claim 1, wherein the mixture of ethers comprises
a first ether comprising a first hydrocarbon group bonded to the oxygen by a primary carbon and a second first hydrocarbon group bonded to the oxygen by a primary carbon and
a second ether comprising a hydrocarbon group bonded to the oxygen by a secondary or tertiary carbon.

4. The process of claim 3, wherein the first ether is at least one selected from the group consisting of diethyl ether, di-n-butyl ether, and di-n-propyl ether.

5. The process of claim 4, wherein the second ether is at least one selected from the group consisting of diisopropyl ether, methyl tert-butyl ether, ethyl tert-butyl ether, and anisole.

6. The process of claim 3, wherein the second ether is at least one selected from the group consisting of diisopropyl ether, methyl tert-butyl ether, ethyl tert-butyl ether, and anisole.

7. The process of claim 1, wherein the mixture of the ethers comprises a first ether comprising a linear hydrocarbon group and a second ether comprising a branched hydrocarbon group.

8. The process of claim 1, wherein the mixture of the ethers comprises a first ether comprising two linear hydrocarbon groups and a second ether comprising two branched hydrocarbon groups.

9. The process of claim 1, wherein the mixture of ethers is selected from the group consisting of
a mixture of diethyl ether and diisopropyl ether,
a mixture of diethyl ether and methyl tert-butyl ether,
a mixture of diethyl ether and ethyl tert-butyl ether,
a mixture of di-n-butyl ether and diisopropyl ether,
a mixture of di-n-butyl ether and methyl tert-butyl ether, and
a mixture of di-n-butyl ether and ethyl tert butyl ether.

10. The process of claim 1, wherein the mixture of the ethers comprises:
diethyl ether, di-n-propyl ether, and/or di-n-butyl ether; and
diisopropyl ether, methyl tert-butyl ether, and/or ethyl tert-butyl ether.

11. The process of claim 10, wherein a molar ratio of the donor to the aluminum trihalide and/or the alkylaluminum halide is in a range of from 0.4:1 to 1:1.

12. The process of claim 1, wherein the aluminum trihalide or alkylaluminum halide is selected from the group consisting of aluminum trichloride, ethylaluminum dichloride, iso-butylaluminum dichloride, diethylaluminum chloride, and diiso-butylaluminum chloride.

13. The process of claim 1, wherein the aluminum trihalide is present and is an aluminum trichloride-donor complex,
wherein the alkylaluminum halide is present and is an alkyl aluminum chloride-donor complex, or
wherein the alkylaluminum halide is present and is a dialkyl aluminum chloride-donor complex.

14. The process of claim 1, wherein a molar ratio of the aluminum trihalide or alkylaluminum halide to the isobutene monomer used in the case of homopolymerization of isobutene, or to a total amount of polymerizable monomers in the isobutene-comprising monomer mixture in the case of copolymerization of isobutene, based on each individual functional site of the aluminum trihalide or alkylaluminum halide, is in a range of 0.001:1 to 0.2:1.

15. The process of claim 1, wherein the polymerization is performed with a mono- or polyfunctional initiator which is at least one selected from the group consisting of organic hydroxyl compounds in which one or more hydroxyl groups are each bonded to an $sp^3$-hybridized carbon atom, organic halogen compounds in which one or more halogen atoms are each bonded to an $sp^3$-hybridized carbon atom, and water.

16. The process of claim 15, wherein the initiator comprises water, methanol, ethanol, 1-phenylethanol, 1-(p-methoxyphenyl)ethanol, n-propanol, isopropanol, 2-phenyl-2-propanol, n-butanol, isobutanol, sec-butanol, test-butanol, 1-phenyl-1-chloroethane, 2-phenyl-2-chloropropane, tert-butyl chloride, 1,3-bis(1-hydroxy-1-methylethyl)benzene, and/or 1,4-bis(1-hydroxy-1-methylethyl)benzene.

17. The process of claim 15, wherein a molar ratio of the initiator to the isobutene monomer in the case of homopolymerization of isobutene, or to a total amount of polymerizable monomers in the isobutene-comprising monomer mixture in the case of copolymerization of isobutene, based on each individual functional site of the initiator, is in a range of 0.0005:1 to 0.1:1.

18. The process of claim 1, wherein the polymerization is performed at a temperature in a range of −90° C. to +30° C.

19. The process of claim 15, wherein the initiator comprises water, and wherein a molar ratio of the initiator to the isobutene monomer in the case of homopolymerization of isobutene, or to a total amount of polymerizable monomers in the isobutene-comprising monomer mixture in the case of copolymerization of isobutene, is in a range of 0.0001:1 to 0.11.

20. The process of claim 1, wherein the content of the terminal vinylidene double bonds per polyisobutene chain end is more than 80 mol % to less than 100 mol %.

* * * * *